United States Patent
Chen et al.

(10) Patent No.: US 9,967,945 B2
(45) Date of Patent: May 8, 2018

(54) ELECTRONIC APPARATUS

(71) Applicant: Delta Electronics (Shanghai) Co., Ltd., Shanghai (CN)

(72) Inventors: Jian Chen, Shanghai (CN); Xiao-Ping Fu, Shanghai (CN); Xing-Hua Zhang, Shanghai (CN)

(73) Assignee: DELTA ELECTRONICS (SHANGHAI) CO., LTD., Shanghai (CN)

(*) Notice: Subject to any disclaimer, the term of this patent is extended or adjusted under 35 U.S.C. 154(b) by 136 days.

(21) Appl. No.: 15/188,993

(22) Filed: Jun. 22, 2016

(65) Prior Publication Data
US 2017/0188433 A1    Jun. 29, 2017

(30) Foreign Application Priority Data
Dec. 28, 2015  (CN) .......................... 2015 1 1005943

(51) Int. Cl.
*H05B 33/08*    (2006.01)

(52) U.S. Cl.
CPC ..... *H05B 33/0884* (2013.01); *H05B 33/0812* (2013.01); *H05B 33/0827* (2013.01); *H05B 33/0851* (2013.01)

(58) Field of Classification Search
CPC ............ H05B 33/0884; H05B 33/0851; H05B 33/0812; H05B 33/0827
See application file for complete search history.

(56) References Cited

U.S. PATENT DOCUMENTS

2017/0325302 A1*  11/2017  Elferich ............. H05B 33/0812

FOREIGN PATENT DOCUMENTS

| CN | 101431845 B | 5/2012 | |
|---|---|---|---|
| CN | 103314398 A | 9/2013 | |
| CN | 103430439 A | 12/2013 | |
| CN | 103543777 A | 1/2014 | |
| JP | 2009290183 A | 12/2009 | |
| JP | 2010129612 A | 6/2010 | |
| JP | 2015216813 A | 12/2015 | |
| JP | 5962703 B2 * | 8/2016 | ............ H92M 3/155 |

* cited by examiner

*Primary Examiner* — Robert Deberadinis
(74) *Attorney, Agent, or Firm* — CKC & Partners Co., Ltd.

(57) ABSTRACT

An electronic device comprises a voltage conversion unit, a first load unit, a current adjusting unit, and a control unit. The voltage conversion unit is configured to transfer an input voltage to an output voltage. The current adjusting unit electrically is coupled with the second terminal of the load unit. The current adjusting unit is configured to control a first driving current flowing through the first load unit according to a first current reference signal. The control unit is electrically coupled with the first load unit and the voltage conversion unit. The control unit is configured to generate a first voltage reference signal according to the first current reference signal and generate a first control signal to the voltage conversion unit according to a voltage of the second terminal of the first load unit and the first voltage reference signal.

20 Claims, 13 Drawing Sheets

ELECTRONIC APPARATUS

RELATED APPLICATIONS

This application claims priority to China Application Serial Number 201511005943.4, filed Dec. 28, 2015, which is herein incorporated by reference.

BACKGROUND

Field of Invention

The present invention relates to an electronic device. More particularly, the present invention relates to an electronic device for saving power consumption.

Description of Related Art

Most modern lighting devices have adopted incandescent bulbs or fluorescent tubes. However, as the maturity of the lighting technology or the semiconductor technology progresses, modern light emitting diode (LED) not only has high luminous efficiency but also saves on power consumption. Therefore, there is a significant demand for LEDs, which are now flourishing.

However, the current common LED driver usually consists of a direct current (DC) voltage source and a linear constant current circuit. In order to reduce loss of the linear constant current circuit, the output voltage of the DC voltage source is regulated, such that the voltage across the linear constant current circuit is controlled within a certain range to prevent the linear constant current circuit from generating an excessive loss. Due to the reference voltage for controlling the linear constant current circuit being a fixed value, the driver efficiency cannot be optimized under a light load condition.

Besides, the present LED driver usually protects the circuit by stopping the output voltage of the DC voltage source in the case it has short-circuited. However, in the application of multi-path load in parallel, the method cannot independently protect each path load of the multi-path load. Therefore, the output voltages of the other path loads are affected when one path load of the multi-path load is short-circuited. Further, the character of components in the general linear constant current circuit limits the driver. Thus, the LED driver cannot achieve a wider dimming range.

SUMMARY

One aspect of the present invention provides an electronic device. The electronic device comprises a voltage conversion unit, a first load unit, a current adjusting unit, and a control unit. The voltage conversion unit is configured to transfer an input voltage to an output voltage. The first load unit comprises a first terminal and a second terminal. The first terminal of the first load unit is configured to receive the output voltage. The current adjusting unit electrically is coupled with the second terminal of the first load unit, and the current adjusting unit is configured to control a first driving current flowing through the first load unit according to a first current reference signal. The control unit is electrically coupled with the first load unit and the voltage conversion unit, and the control unit is configured to generate a first voltage reference signal according to the first current reference signal and generate a first control signal to the voltage conversion unit according to a voltage of the second terminal of the first load unit and the first voltage reference signal.

Another aspect of the present invention provides an electronic device. The electronic device comprises a voltage conversion unit, a plurality of load units, a plurality of current adjusting units, and a control unit. A voltage conversion unit is configured to transfer an input voltage to an output voltage. Each one of the load units comprises a first terminal and a second terminal, and the first terminal configured to receive the output voltage. Each one of the current adjusting units respectively and electronically coupled with the second terminal of the load units. The current adjusting units is configured to control a driving current flowing through each one of the load units according to a plurality of current reference signals. The control unit electrically is coupled with the load units and the voltage conversion unit. The control unit electrically is configured to generate at least one voltage reference signal according to the current reference signals and generate a first control signal to the voltage conversion unit according to a voltage of the second terminal of the load units and the at least one voltage reference signal.

In summary, the present invention saves power consumption by adjusting the current reference signal received from the linear constant current circuit and controlling the voltage conversion unit according to the control signal generated by the voltage reference signal. In some embodiments, the electronic device can individually protect each path load of the multi-path load in parallel by the constant power protection circuit. In addition, in some embodiments, the electronic device expands the dimming range in a dimming application by configuring the supplementary current control unit.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
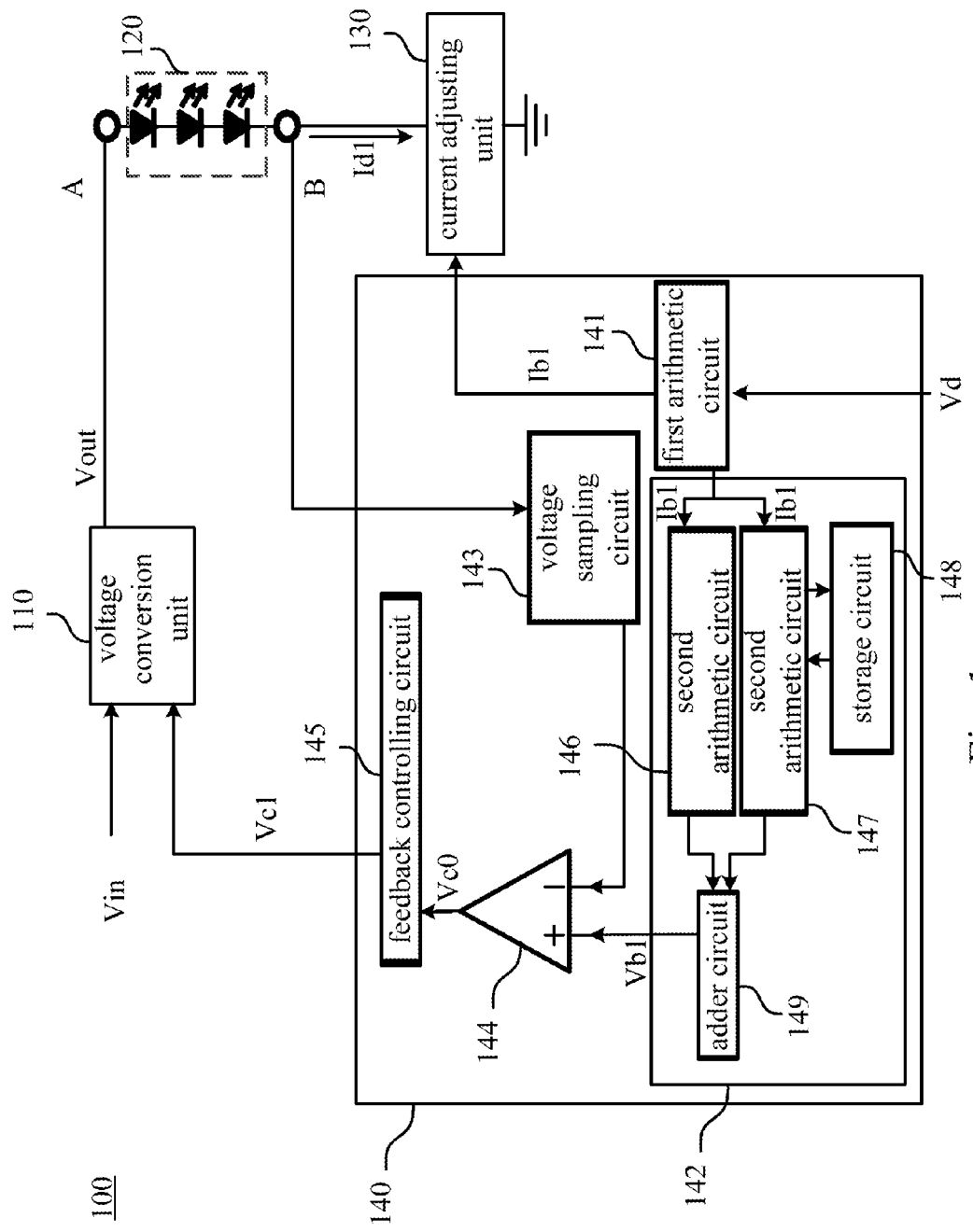
FIG. 1 depicts a schematic diagram of an electronic device according to one embodiment of this invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

A description is provided with reference to FIG. 1. FIG. 1 depicts a schematic diagram of an electronic device 100 according to one embodiment of this invention. As shown in FIG. 1, the electronic device 100 includes a voltage conversion unit 110, a load unit 120, a current adjusting unit 130 and a control unit 140. The voltage conversion unit 110 can be a boost converter, a buck converter, a flyback converter, or any other voltage converter. The load unit 120 can be consisted of light-emitting diode, resistance, or any other load unit that can be used for obtaining energy. An illustration is only provided for convenient to describe the load unit 120 by a light-emitting diode in series shown in FIG. 1. However, the actual application is not limited to the following embodiments. The electronic device 100 can apply to any electronic device having the voltage converter. The present invention is not limited to the above examples.

The voltage conversion unit 110 is used for transferring the input voltage Vin to the output voltage Vout. Wherein the input voltage Vin can be the DC voltage or AC voltage, and the output voltage Vout can be DC voltage. In other words, no matter the input voltage Vin is DC voltage or AC voltage, all the input voltage Vin can be transferred to DC voltage having any voltage value by the voltage conversion unit 110. That is, the voltage conversion unit 110 is a DC/DC converter or AC/DC converter.

The load unit 120 has a first terminal A for receiving the output voltage, and a second terminal B. As shown in FIG. 1, the load unit 120 includes three series-coupled light-emitting diodes. In actual application, the number of light-emitting diodes can be at least three or any other number greater than three. As mentioned above, the load unit 120 can be consisted of resistance, or any other load unit that be used for obtaining energy. However, the present application is not limited to these components.

The current adjusting unit 130 is electrically coupled with the second terminal B of the load unit 120. The current adjusting unit 130 is used for controlling the driving current Id1 flowing through the load unit 120 according to the current reference signal Ib1. The control unit 140 is electrically coupled with the load unit 120 and the voltage conversion unit 110. The control unit 140 is used for generating the voltage reference signal Vb1 according to the current reference signal Ib1, and the control unit 140 generates the control signal Vc1 to the voltage conversion unit 110 according to the voltage of the second terminal B and the voltage reference signal Vb1.

Generally speaking, there exists a positive correlation between the driving current Id1 flowing through the light-emitting diode of the load unit 120 and the luminance of the diode. That is, the luminance of light-emitting diode will be higher when the driving current Id1 is larger. Therefore, in this embodiment, by means of controlling the driving current Id1 flowing through the load unit 120 by the current adjusting unit 130, the luminance of the light-emitting diode in the load unit 120 can be changed. Further, electronic device 100 can receive the dimming signal Vd. The dimming signal Vd can be an analogy voltage signal between 0 to 10V, a pulse width modulation (PWM), or any other type of electrical signal. The control unit 140 generates a constant-current reference signal Ib1 according to the dimming signal Vd, and the control unit 140 transmits the constant-current reference signal Ib1 to the current adjusting unit 130. As shown in FIG. 1, for example, the first arithmetic circuit 141 can generate the constant-current reference signal Ib1. The first arithmetic circuit 141 can be a micro controller unit (MCU), an arithmetic logic unit (ALU), a central processing unit (CPU), or any other logic circuit having logic calculation function. However, the present application is not limited to these components. The current adjusting unit 130 controls the driving current Id1 at a current value corresponding to the constant-current reference signal Ib1 according to the constant-current reference signal Ib1.

Figure 2:
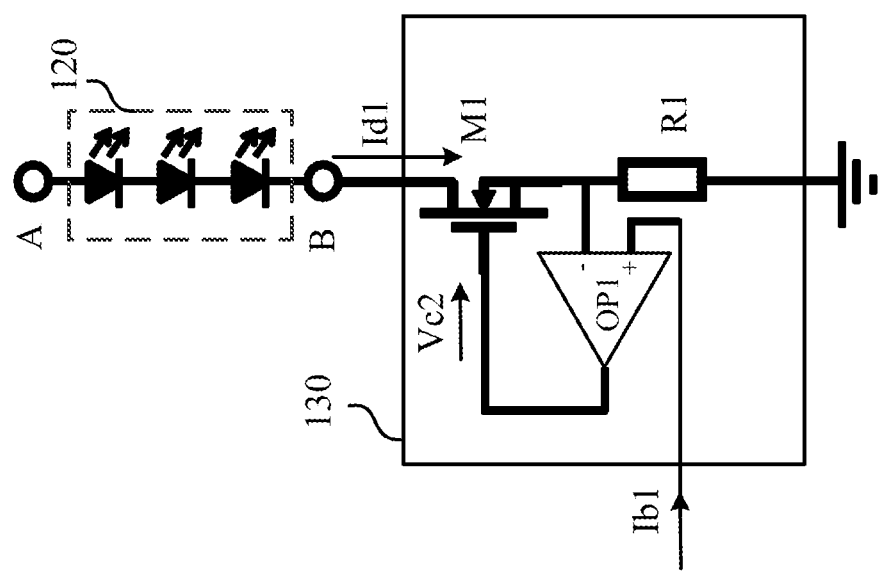
FIG. 2 depicts a schematic diagram of the current adjusting unit in FIG. 1.

Specifically, please refer to FIG. 1 and FIG. 2. FIG. 2 depicts a schematic diagram of the current adjusting unit 130 in FIG. 1. As shown in FIG. 2, the current adjusting unit 130 includes a transistor M1, a resistance R1 and an operational amplifier OP1. The transistor M1 includes a first terminal electrically coupled with the load unit 120, a second terminal and a control terminal. The resistance R1 is electrically coupled with the second terminal of the transistor M1. Wherein the transistor M1 operates at a linear interval. The operational amplifier OP1 includes a first terminal for receiving the current reference signal Ib1, a second terminal electrically coupled with the second terminal of the transistor M1, and an output terminal electrically coupled with the control terminal of the transistor M1. The output terminal of the operational amplifier OP1 outputs the control signal Vc2 to the control terminal of the transistor M1.

In actual application, the transistor M1 can be an NMOSFET, an N-type bipolar junction transistor, PMOSFET, P-type bipolar junction transistor, or other transistor with equivalence function. However, the present application is not limited to these components. Generally, the transistor can be operated at a cut-off region, a non-linear interval and a linear interval. When the transistor operates at linear interval, the voltage of the control terminal of the transistor is about positively associated with the current flowing through the transistor. Therefore, in this embodiment, the transistor M1 operates at the linear interval and controls the value of driving current Id1 by the control signal Vc2 transmitted from the operational amplifier OP1. For example, when the current reference signal Ib1 received by the first terminal of the operational amplifier OP1 is higher than the voltage of the second terminal of the operational amplifier OP1, the voltage of the control signal Vc2 outputted from the operational amplifier OP1 will rise up to increase the threshold voltage of the transistor M1, so as to make the driving current Id1 rise up to increase the voltage of the second terminal of the operational amplifier OP1. In contrast, when the current reference signal Ib1 received by the first terminal of the operational amplifier OP1 is lower than the voltage of the second terminal of the operational amplifier OP1, the voltage of the control signal Vc2 outputted from the operational amplifier OP1 will drop down to decrease the threshold voltage of the transistor M1, so as to make the driving current Id1 drop down to decrease the voltage of the second terminal of the operational amplifier OP1. As such, transistor M1 can control the driving current Id1 according to the current reference signal Ib1.

Please continuously refer to FIG. 1, the control unit 140 further includes a voltage reference calculation circuit 142, a voltage sampling circuit 143, a comparing circuit 144 and a feedback controlling circuit 145. The voltage reference calculation circuit 142 is used for calculating the voltage difference VR1 across the resistance R1 according to the current reference signal Ib1, calculating the impedance Rm of the transistor M1 according to the current reference signal Ib1, and calculating the voltage difference VR2 across the transistor M1 according to the current reference signal Ib1 and the impedance Rm of the transistor M1. Wherein the current reference signal Ib1 is positively associated with the sum of the voltage difference VR1 and the voltage difference VR2. The comparing circuit 144 is electrically coupled with the voltage sampling circuit 143. The comparing circuit 144 is used for generating the comparing signal Vc0 according to the voltage of the second terminal B of the load unit 120 and the voltage reference signal Vb1. The feedback controlling circuit 145 is electrically coupled with comparing circuit 144. The feedback controlling circuit 145 is used for generating the control signal Vc1 according to the comparing signal Vc0.

Further, the voltage reference calculation circuit 142 described in present embodiment can include the second arithmetic circuits 146, 147, storage circuit 148, and adder circuit 149. However, this embodiment is only for the convenience of description. In actual application, the component of the voltage reference calculation circuit 142 is not limited to the above examples. Similarly, the second arithmetic circuits 146, 147 can be MCUs, ALUs, CPUs, or any other logic circuits having logic calculation function. However, the present application is not limited to these components. The storage circuit 148 can be a volatile memory, a non-volatile memory, or any memory having storing function. And, the present application is not limited to these components.

The second arithmetic circuits 146, 147 of the voltage reference calculation circuit 142 firstly receive the current reference signal Ib1. In practice, based on above mentioned, the transistor M1 can control the driving current Id1 according to the current reference signal Ib1. And, the current reference signal Ib1 represents the present value of driving current Id1. Thus, the second arithmetic circuits 146, 147 can separately calculate the voltage difference VR1 of the resistance R1 and the voltage difference VR2 of the transistor M1 according to the current reference signal Ib1.

Figure 3:
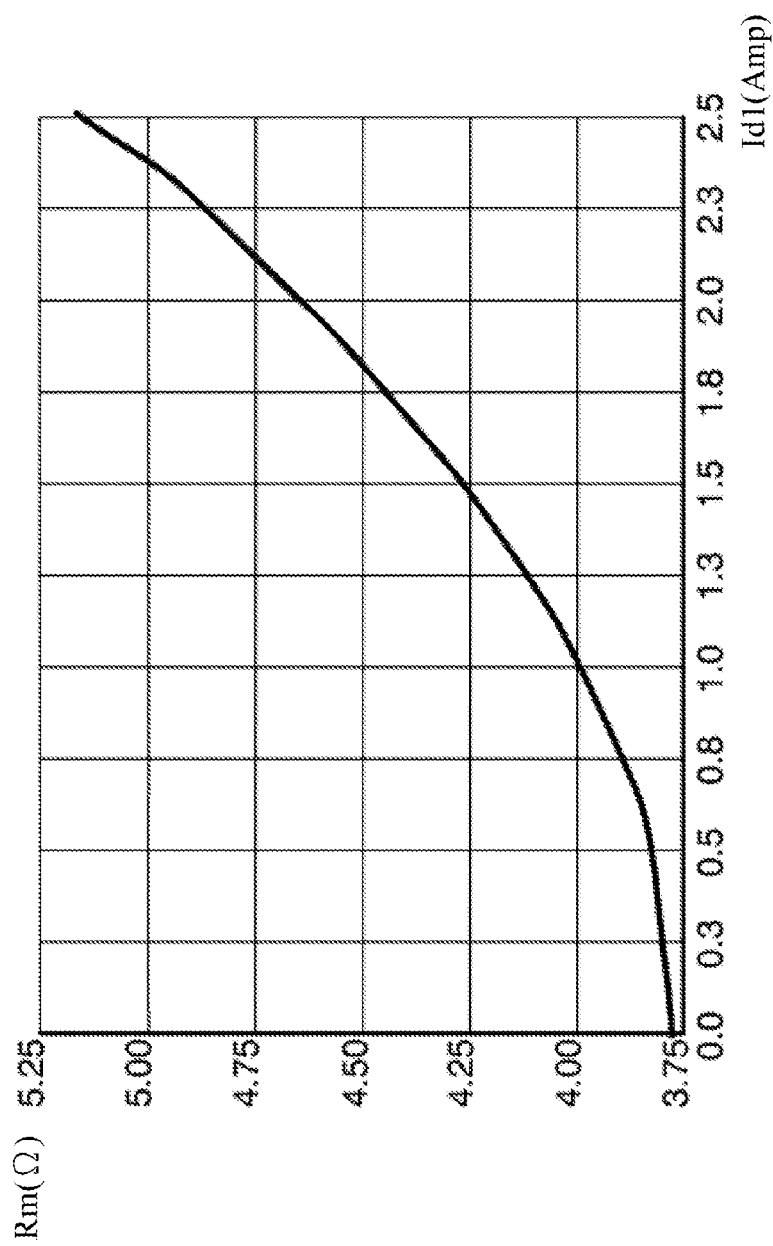
FIG. 3 depicts a schematic diagram of the impedance characteristic curve of the transistor according to one embodiment of this invention.

In regard to the voltage difference VR1 of the resistance R1, the second arithmetic circuit 146 is used for multiplying the value of resistance R1 by the value of driving current Id1 to obtain the voltage difference VR1. On another hand, in regard to the voltage difference VR2 of the transistor M1, the storage circuit 148 is used for storing the impedance characteristic curve when the transistor M1 operates at linear interval in this embodiment. Please refer to FIG. 3 in the same time, FIG. 3 depicts a schematic diagram of the impedance characteristic curve of the transistor M1 according to one embodiment of this invention. As shown in FIG. 3, the curve represents the impedance Rm when the transistor M1 operates at a fully conducting condition in the linear interval. The impedance Rm changed with the driving current Id1 of the transistor M1 is stored in the storage circuit 148 as mentioned in FIG. 1. As such, the second arithmetic circuit 147 can access the data stored in storage circuit 148 in any time to obtain the impedance Rm of the transistor M1 corresponding to the different driving current Id1. Next, the second arithmetic circuit 147 multiplies the value of accessed impedance Rm corresponding to the present driving current Id1 by the present driving current Id1, so as to obtain the voltage difference VR2 of the transistor M1. It needs to be supplemented that the impedance characteristic curve in FIG. 3 does not consider the temperature factor. In practice, the temperature will affect the impedance Rm of the transistor M1. Therefore, it needs to be further considered that the impedance characteristic curve may be affected by the temperature factor in this condition.

As shown in FIG. 1, after calculating the voltage difference VR1 of the resistance R1 and the voltage difference VR2 of the transistor M1, the voltage differences VR1, VR2 will be further transmitted to the adder circuit 149 to generate the voltage reference signal Vb1. Thus, the voltage reference signal Vb1 is associated with the sum of the voltage difference VR1 and the voltage difference VR2.

In some embodiments, the voltage conversion unit 110 may cause the ripple while performing the transformation operation. The voltage reference signal Vb1 generated by the adder circuit 149 can further comprise a reserve (e.g. 10%), so as to prevent the situation that the transistor M1 of the current adjusting unit 130 is affected by the ripple of voltage conversion unit 110 and can not perform the normal operation in linear interval. For example, assuming the maximum loading current of transistor M1 is 1 Amp, the current driving current Id1 is 1 Amp, and the resistance R1 is 0.5Ω. According to FIG. 3, the impedance Rm of the transistor M1 is 4Ω when the driving current Id1 is 1 Amp. Therefore, the current adjusting unit 130 has the voltage difference of at least $(0.5+4) \times (1) = 4.5$ Volt. That is, the theoretical value of the voltage reference signal Vb1 in this example can be 4.5 Volts. However, in this example, the voltage reference signal Vb1 with a reserve (e.g. 10%) can be used, such as $4.5 \times (1+10\%) = 4.95$ s Volt, so as to prevent the transistor M1 of the current adjusting unit 130 affecting by the ripple of voltage conversion unit 110 and prevent the situation that the transistor M1 of the current adjusting unit 130 can not perform the normal operation in linear interval. It can make sure the current adjusting unit 130 operates normally. In other embodiments, the reserve can be 5%, 20% or any multiple, which is not limited herein.

In another example, assuming the current driving current Id1 is 0.5 Amp, according to FIG. 3, when the driving current Id1 is 0.5 Amp, the impedance Rm of the transistor M1 is 3.8Ω. And, the resistance R1 is 0.5Ω. Therefore, the current adjusting unit 130 has the voltage difference of at least (0.5+3.8)×(0.5)=2.15 Volt. That is, the theoretical value of the voltage reference signal Vb1 in this example can be 2.15 Volts. Similarly, the voltage reference signal Vb1 with a reserve (e.g. 10%) can be used, such as 2.15×(1+10%)=2.365 Volt, so as to make sure the current adjusting unit 130 operates normally. Based on comparing above two examples, in this embodiment, the voltage reference signal Vb1 generated by the adder circuit 149 becomes lower when the driving current Id1 becomes smaller. As such, the power consumption can be reduced when the driving current Id1 is smaller. For instance, based on above two examples, the power consumption can be reduced as about 0.5×(4.95−2.365)=1.29 Watts. It should be noted that the values above mentioned are used for illustrating the examples, neither limited thereto nor suggested must use the values.

Please continuously refer to FIG. 1, the voltage of the second terminal B sampled from the load unit 120 can be obtained by the voltage sampling circuit 143. The comparing circuit 144 is used for generating the comparing signal Vc0 according to the voltage of the second terminal B of the load unit 120 and the voltage reference signal Vb1. Then, the feedback controlling circuit 145 generates the control signal Vc1 to voltage conversion unit 110 according to the comparing signal Vc0. Herein, the operation is similar with the operation method of the operational amplifier OP1. For example, when the voltage reference signal Vb1 received by the first terminal of the comparing circuit 144 is higher than the voltage of the second terminal of the comparing circuit 144, the voltage of the comparing signal Vc0 outputted from the comparing circuit 144 will rise up and the feedback controlling circuit 145 will increase the voltage of the control signal Vc1 in the same time, so as to make the voltage conversion unit 110 rise up the voltage of the output signal Vout. On the contrast, when the voltage reference signal Vb1 received by the first terminal of the comparing circuit 144 is lower than the voltage of the second terminal of the comparing circuit 144, the voltage of the comparing signal Vc0 outputted from the comparing circuit 144 will drop down and the feedback controlling circuit 145 will decrease the voltage of the control signal Vc1 in the same time, so as to make the voltage conversion unit 110 drop down the voltage of the output signal Vout. As such, by adjusting the current reference signal received by the linear constant current circuit and by controlling the voltage conversion unit via the control signal generated by the voltage reference signal, the present application reduces the power consumption under the condition while the electronic device is operated in light loading.

Figure 4A:
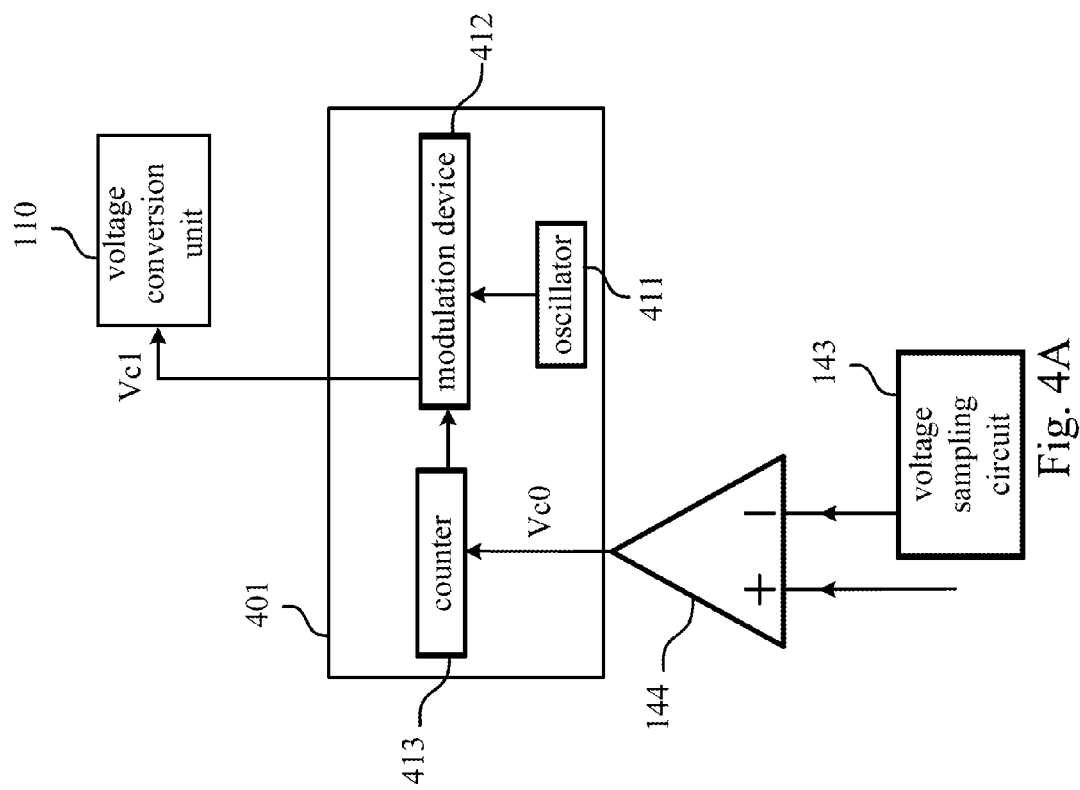
FIG. 4A depicts a schematic diagram of the feedback controlling circuit according to one embodiment of this invention.
Figure 4B:
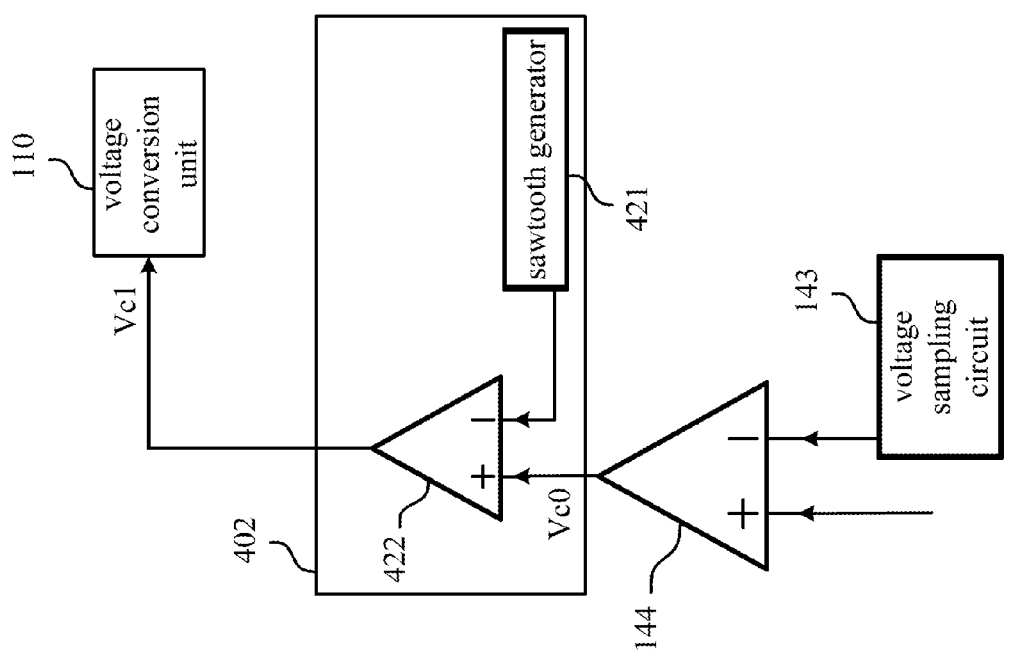
FIG. 4B depicts a schematic diagram of the feedback controlling circuit according to one embodiment of this invention.

Please refer to FIG. 4A and FIG. 4B, FIG. 4A depicts a schematic diagram of the feedback controlling circuit 401 according to one embodiment of this invention. FIG. 4B depicts a schematic diagram of the feedback controlling circuit 402 according to one embodiment of this invention. The feedback controlling circuits 401, 402 can be applied to the feedback controlling circuit 145 in FIG. 1. As shown in FIG. 4A, the feedback controlling circuits 401 is a digital feedback controlling circuit. The feedback controlling circuits 401 includes an oscillator 411, a digital pulse width modulation device 412 and a counter 413. The digital pulse width modulation device 412 will output a square wave. The oscillator 411 generates the frequency of the square wave. The comparing circuit 144 outputs the comparing signal Vc0 to the counter 413. Then, the counter 413 outputs the counting result to the digital pulse width modulation device 412. The digital pulse width modulation device 412 generates the control signal Vc1 according to the counting result. The type of the control signal Vc1 can be a pulse width modulation (PWM) signal. In fact, the counter 413 modulates the pulse width of the control signal Vc1 according to the comparing signal Vc0 outputted by the comparing circuit 144. That is, the counter 413 adjusts the duty cycle to modulate the pulse width. In general, the average voltage of the comparing signal Vc0 is higher when the duty cycle is higher. In other embodiment, as shown in FIG. 4B, the feedback controlling circuit 402 is an analog feedback controlling circuit. The feedback controlling circuit 402 includes sawtooth generator 421 and comparing circuit 422. The comparing signal Vc0 outputted from comparing circuit 144 will be compared to the sawtooth wave generated by the sawtooth generator 421, so as to generate the control signal Vc1. The feedback controlling circuit 401 has similar function as the feedback controlling circuit 402. The type of the control signal Vc1 generated by feedback controlling circuit 401 can be a PWM signal, which can control the voltage conversion unit 110 according to the different width of the pulse. However, it is not limited to the method of modulating the pulse width in other embodiment.

Figure 5:
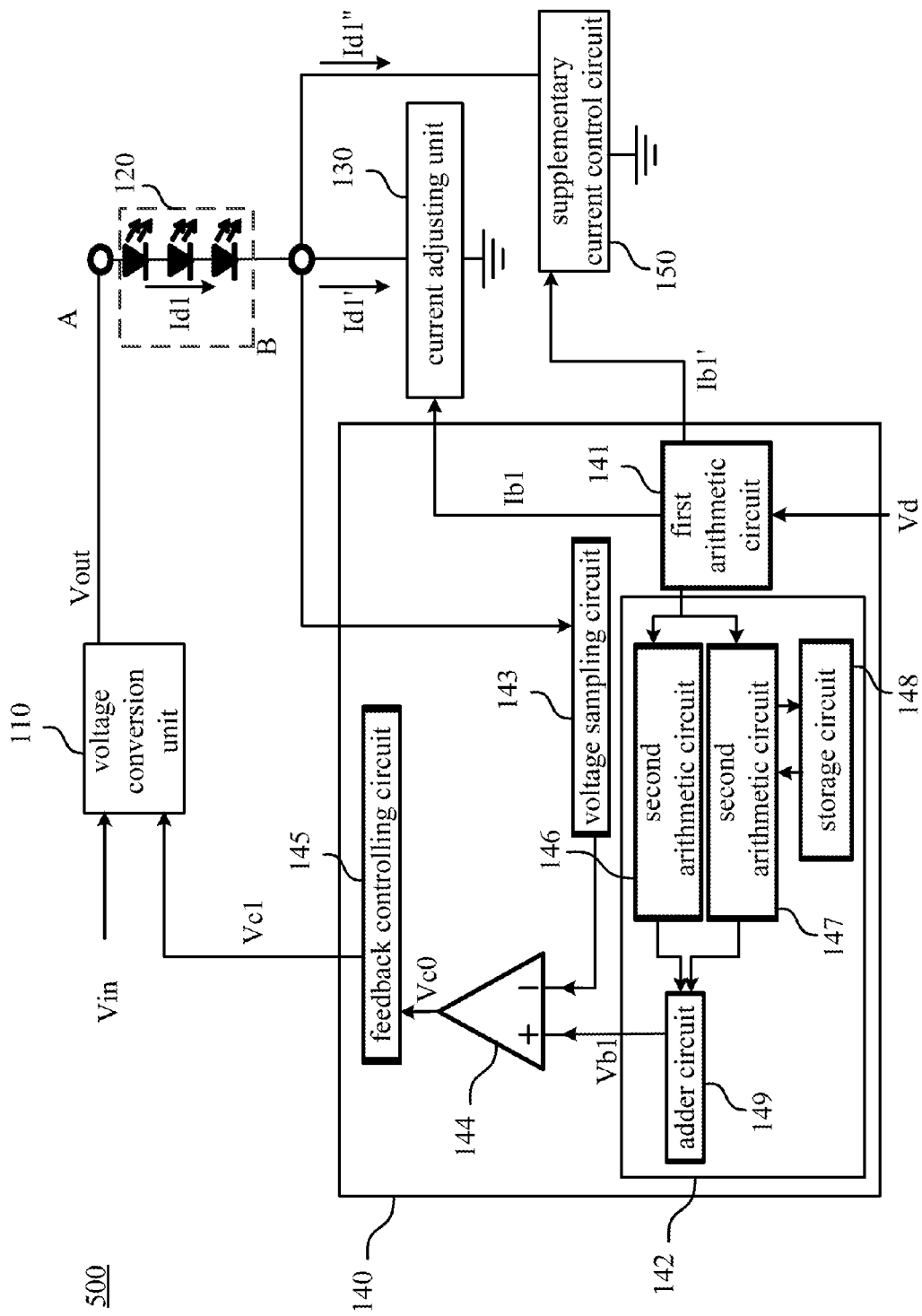
FIG. 5 depicts a schematic diagram of the electronic device according to one embodiment of this invention.

Please continuously refer to FIG. 5, FIG. 5 depicts a schematic diagram of the electronic device 500 according to one embodiment of this invention. As shown in FIG. 5, comparing to the electronic device 100, the electronic device 500 further includes a supplementary current control unit 150. The supplementary current control unit 150 is coupled with the current adjusting unit 130 in parallel. Wherein the current adjusting unit 130 controls a first potion Id1' of the driving current Id1 according to the current reference signal Ib1. The supplementary current control unit 150 controls a second potion Id1" of the driving current Id1 according to a supplementary current reference signal Ib1'. The other components of the electronic device 500 have the same description with the corresponding components of the electronic device 100. Thus, the other components of the electronic device 500 are not further described herein.

Figure 6:
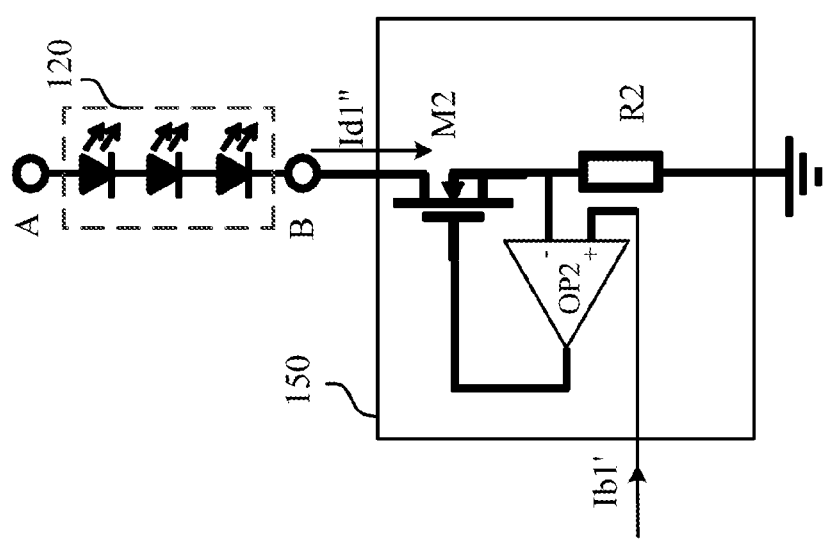
FIG. 6 depicts a schematic diagram of the supplementary current control unit in FIG. 5 according to one embodiment of this invention.

Please refer to FIG. 5 and FIG. 6 in the same time, FIG. 6 depicts a schematic diagram of the supplementary current control unit 150 in FIG. 5 according to one embodiment of this invention. As shown in FIG. 6, the circuit connection method of the supplementary current control unit 150 is the same as the current adjusting unit 130. The supplementary current control unit 150 includes a transistor M2, a resistance R2 and an operational amplifier OP2. The transistor M2 includes a first terminal electronically coupled with the load unit 120, a second terminal and a control terminal. The resistance R2 is electrically coupled with the second terminal of transistor M2. Wherein the transistor operates at the linear interval. The difference is that the proportion between the impedance of the resistance R2 and the impedance of the resistance R1 is N, and N is a value bigger than 10. In this way, the first potion Id1' of the driving current Id1 is larger than the second potion Id1" of the driving current Id1.

Further, the range of the driving current Id1 adjusted by the current adjusting unit 130 corresponding to the dimming signal Vd is limited due to the component characteristic, e.g. adjusting to the 1% of the maximal driving current. Therefore, assuming the adjustable range of the driving current Id1 of current adjusting unit 130 is 1 A to 10 mA. In this embodiment, a supplementary current control unit 150 can be used for adjusting the range of the current of driving current Id1 as 10 mA to 100 uA. As such, the dimming range of the electronic device 500 can be expanded to 1 A to 100 uA, and the dimming range of the electronic device 500 can be expanded from original 100%-1% to 100%-0.01% for obtaining the more precisely dimming range. The method above mentioned can be implemented by the impedance of the resistance R2 of supplementary current control unit 150 and the resistance R1 of the current adjusting unit 130 having different impedance. For example, the resistance R1 is 10Ω, the resistance R2 is 1000Ω, so as to make a first potion Id1' of the driving current Id1 larger than a second potion Id1" of the driving current Id1 for achieving different dimming ranges. The present invention discloses that the electronic device expands the dimming range in dimming application by configuring the supplementary current control unit.

Figure 7:
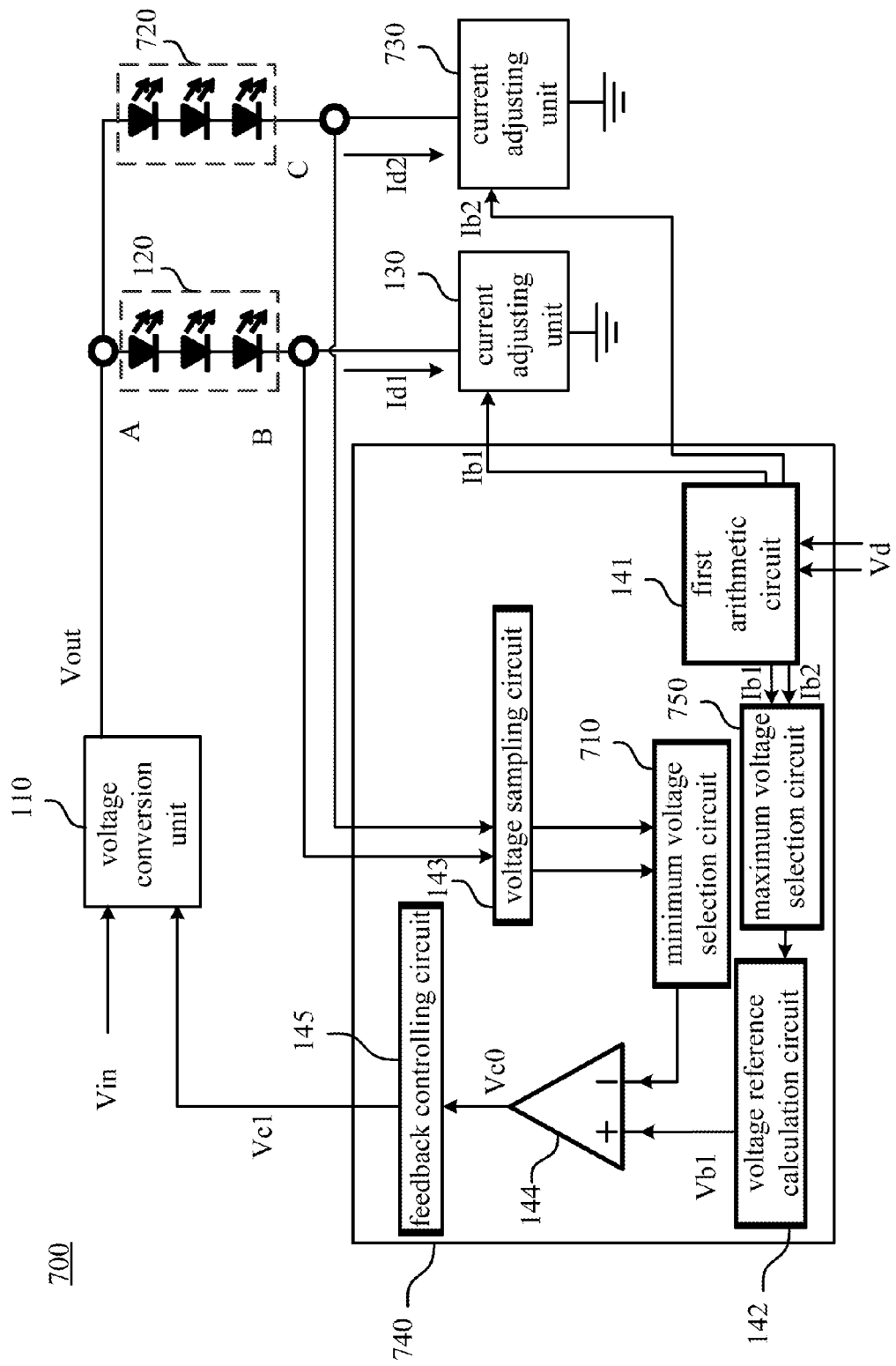
FIG. 7 depicts a schematic diagram of an electronic device according to one embodiment of this invention.

Please refer to FIG. 7, FIG. 7 depicts a schematic diagram of an electronic device 700 according to one embodiment of this invention. As shown in FIG. 7, comparing to electronic device 100, the electronic device 700 further includes a load unit 720 and a current adjusting unit 730. That is, the electronic device 700 includes two load units 120, 720 and two current adjusting units 130, 730. The current adjusting units 130, 730 respectively and electronically coupled with the second terminals B, C of the load units 120, 720. The current adjusting units 130, 730 are used for controlling the driving current Id1, Id2 flowing through the load units 120, 720. In practice, the number of the load units can be any positive integer, which is not limited thereto. That is, the electronic device 700 is an application of multi-path load in parallel.

Figure 8:
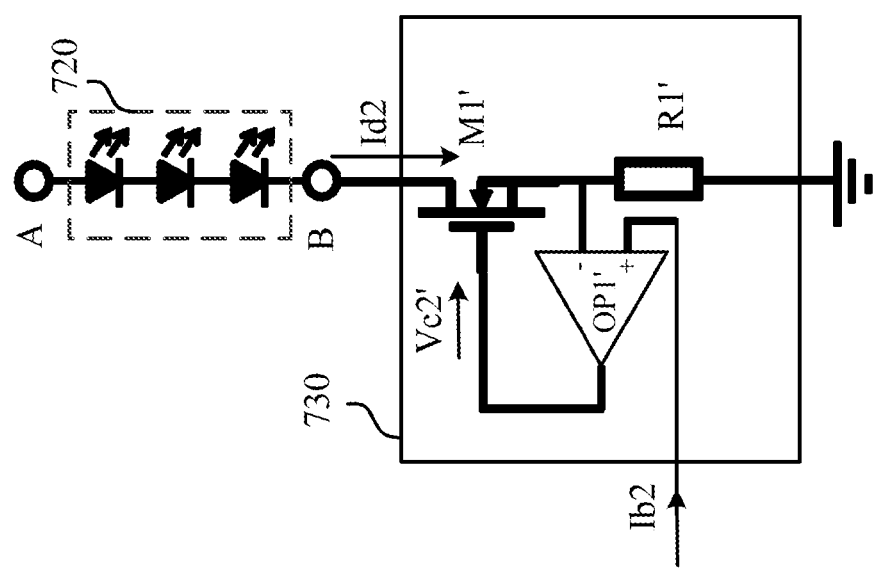
FIG. 8 depicts a schematic diagram of the current adjusting unit in FIG. 7 according to one embodiment of this invention.

The internal of current adjusting unit 730 is implemented similar with the current adjusting units 130. Herein refer to FIG. 8, FIG. 8 depicts a schematic diagram of the current adjusting unit in FIG. 7 according to one embodiment of this invention. As shown in FIG. 8, the current adjusting unit 730 includes a transistor M1', a resistance R1', and an operational amplifier OP1'. The transistor M1' includes a first terminal electrically coupled with the load unit 720, a second terminal and a control terminal. The resistance R1' is electrically coupled with the second terminal of the transistor M1'. Wherein the transistor M1' operates in the linear interval. The operational amplifier OP1' includes a first terminal for receiving the current reference signal Ib2, a second terminal coupled with the second terminal of the transistor M1', and an output terminal coupled with the control terminal of the transistor M1'. And, the output terminal of the operational amplifier OP1' outputs the control signal Vc2' to the control terminal of the transistor M1'. The other descriptions related to the current adjusting unit 730 are similar with the current adjusting unit 130 in practice. Thus, other descriptions related to the current adjusting unit 730 are not further described herein.

Compared to the control unit 140, the control unit 740 further includes a minimum voltage selection circuit 710 and a maximum current selection circuit 750. The minimum voltage selection circuit 710 is used for generating a minimum voltage signal according to the minimum value of voltages of the second terminals B, C of the load units 120, 720. The maximum current selection circuit 750 is electrically coupled with the voltage reference calculation circuit 142. The maximum current selection circuit 750 is used for generating a maximum current signal according to the maximum value of the current reference signals Ib1, Ib2. For instance, if the voltage of the second terminal B of the load unit 120 is lower than the voltage of the second terminal C of the load unit 720, the minimum voltage signal is determined as the voltage of the second terminal B of the load unit 120. If the voltage of the second terminal C of the load unit 720 is lower than the voltage of the second terminal B of the load unit 120, the minimum voltage signal is determined as the voltage of the second terminal C of the load unit 720. Similarly, if the current reference signal Ib1 is higher than the current reference signal Ib2, the maximum current signal is determined as the value of the current reference signal Ib1. And, if the current reference signal Ib2 is higher than the current reference signal Ib1, the maximum current signal is determined as the value of the current reference signal Ib2. Based on the same reason, if the electronic device includes more load units, the method can determine the minimum voltage signal and the maximum current signal.

The control unit 740 generates the control signal Vc1 to the voltage conversion unit 110 according to the minimum value of voltages of the second terminal B, C of the load units 120, 720 and the maximum value of the current reference signal Ib1, Ib2. The voltage reference calculation circuit 142 generates the voltage reference signal Vb1 according to the maximum current signal. The voltage reference calculation circuit 142 calculates the voltage difference across the resistance of the current adjusting unit having the maximum value of the current reference signals Ib1, Ib2 according to the maximum current signal. The voltage reference calculation circuit 142 calculates the impedance of the transistor of the current adjusting unit having the maximum value of the current reference signals Ib1, Ib2 according to the maximum current signal, and calculates the voltage difference across the transistor according to the impedance of the transistor. For example, if the maximum value of the current reference signals Ib1, Ib2 is current reference signals Ib1, the voltage reference calculation circuit 142 calculates the voltage difference VR1 of the resistance R1 of the current adjusting unit 130. Also, the voltage reference calculation circuit 142 calculates the impedance Rm of the transistor M1 and calculates the voltage difference VR2 of the transistor M1 according to the impedance Rm of the transistor M1. In contrast, if the maximum value of the current reference signals Ib1, Ib2 is current reference signals Ib2, the voltage reference calculation circuit 142 calculates the voltage difference VR1' of the resistance R1' of the current adjusting unit 730. Also, the voltage reference calculation circuit 142 calculates the impedance Rm' of the transistor M1' and calculates the voltage difference VR2' of the transistor M1' according to the impedance Rm' of the transistor M1'.

It should be noted that the voltage reference signal Vb1 is positively associated with the sum of the voltage difference VR1 and the voltage difference VR2 (or the sum of the voltage difference VR1' and the voltage difference VR2'). As such, through the method above mentioned can make sure that the minimum voltage signal is bigger than the voltage reference signal Vb1. In this way, the method can avoid the situation that any one of the current adjusting unit 130, 730 can not operates at the linear interval. The descriptions of other components in electronic device 700 are similar to the electronic device 100. Thus, the descriptions related to other components in electronic device 700 are not further described herein.

Figure 9:
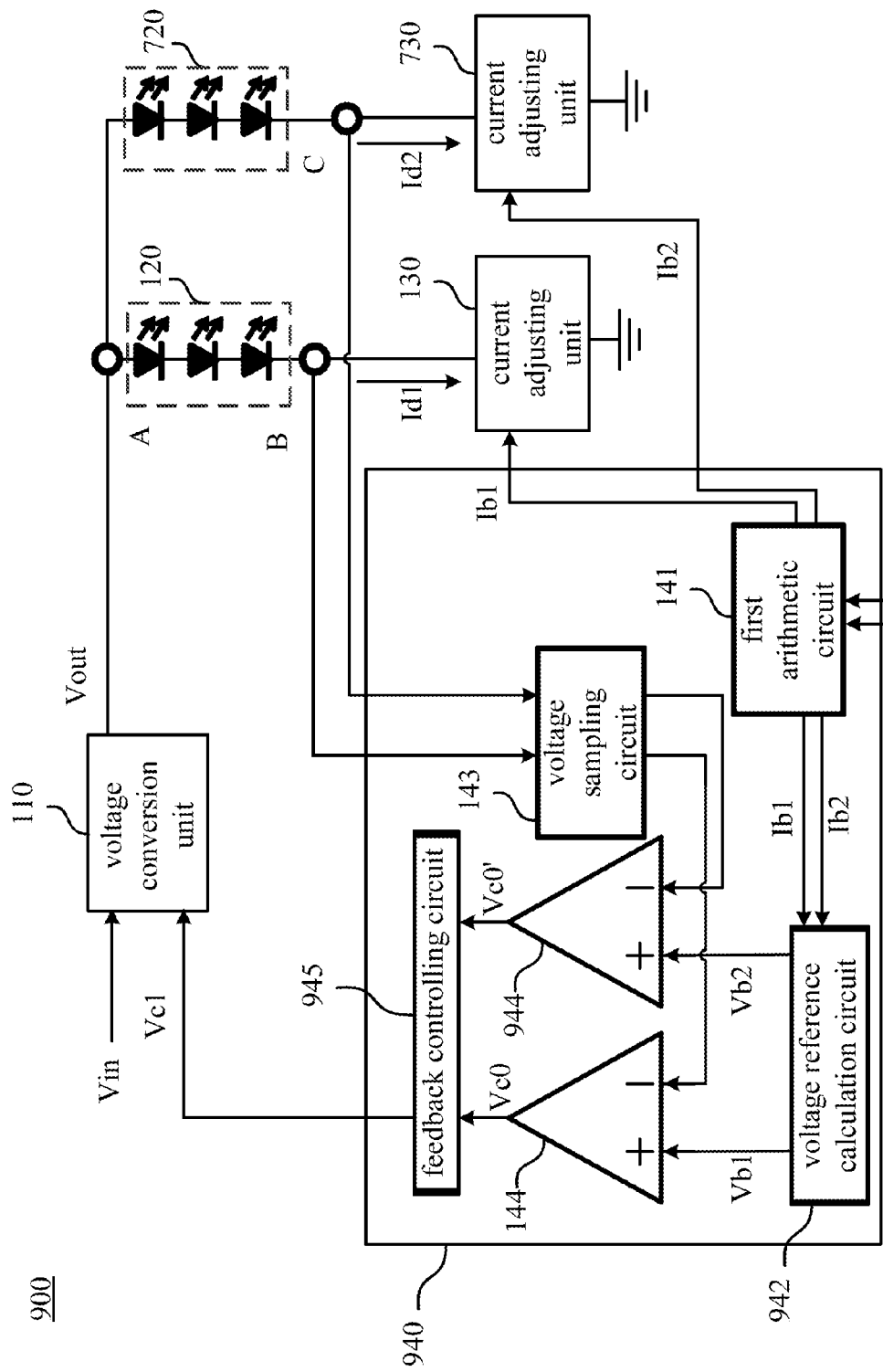
FIG. 9 depicts a schematic diagram of an electronic device according to one embodiment of this invention.

In some embodiment, the application of multi-path load in parallel is not limited to the embodiment of FIG. 7. Please refer to FIG. 9, FIG. 9 depicts a schematic diagram of an electronic device 900 according to one embodiment of this invention. As shown in FIG. 9, the electronic device 900 similarly includes the two load units 120, 720 and two current adjusting units 130, 730 as electronic device 700. The current adjusting units 130, 730 respectively and electronically coupled with the second terminals B, C of the load units 120, 720. The current adjusting units 130, 730 are used for controlling the driving current Id1, Id2 flowing through the load units 120, 720 according to the current reference signals Ib1, Ib2.

However, the difference between the electronic device 900 and the electronic device 700 is that the control unit 940 of the electronic device 900 uses different way to avoid the situation that any current adjusting units 130, 730 can not operates in the linear interval. Further, comparing to the control unit 140, the control unit 940 further includes a comparing circuit 944, which electronically coupled with the voltage sampling circuit 143. The comparing circuit 944 is used for generating the comparing signal Vc0' according to the voltage of the second terminal C of the load unit 720 and a voltage reference signal Vb2. Next, a feedback controlling circuit 945 generates the control signal Vc1 according to the maximum value of the comparing signals Vc0, Vc0'.

Further, the voltage reference calculation circuit 942 of the control unit 940 is used for calculating the voltage differences VR1, VR1' of the resistances R1, R1' corresponding to the current adjusting units 130, 730 according to the current reference signals Ib1, Ib2 and calculating the voltage differences VR2, VR2' of the transistors M1, M1' according to the impedances Rm, Rm' of the transistors M1, M1'.

It should be noticed that the voltage reference signal Vb1 is positively associated with the sum of the voltage difference VR1 of the current adjusting unit 130 and the voltage difference VR2. The voltage reference signal Vb2 is positively associated with the sum of the voltage difference VR1' of the current adjusting unit 730 and the voltage difference VR2'. Thus, the method above mentioned can make sure that the voltage of the second terminals B, C of the load units 120, 720 in each path load are bigger than or equal to the corresponding voltage reference signals Vb1, Vb2 after sampling, so as to avoid the situation that any current adjusting units 130, 730 can not operates in the linear interval. The descriptions of other components in electronic device 700 are similar with the electronic device 100. Thus, the descriptions related to other components in electronic device 700 are not further described herein.

Figure 10:
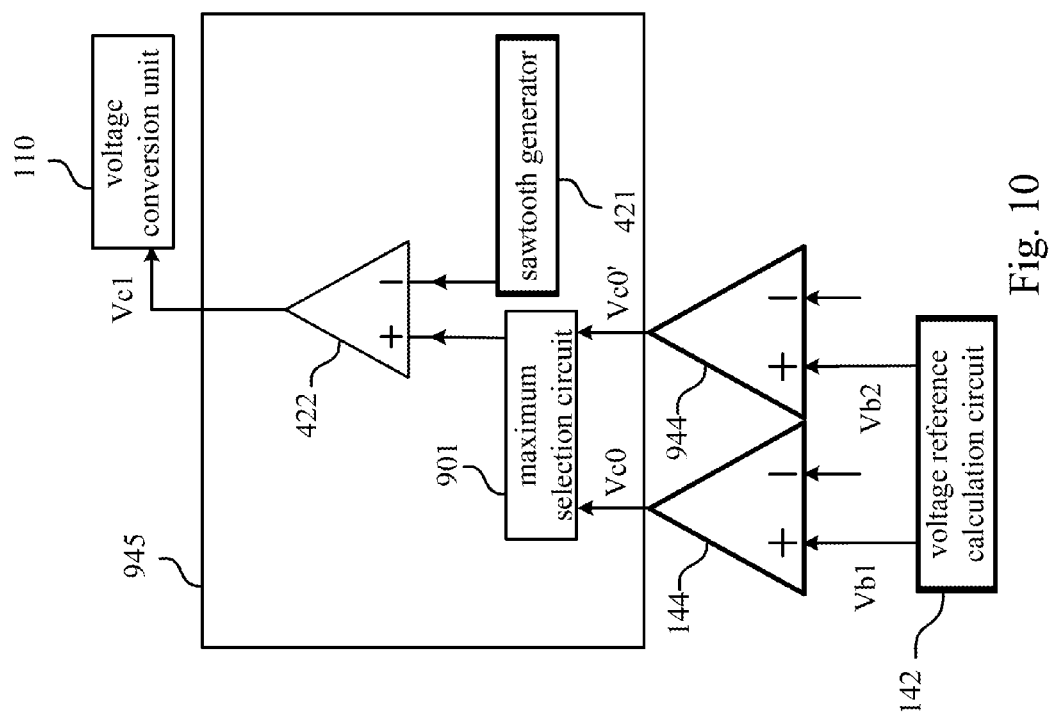
FIG. 10 depicts a schematic diagram of an feedback controlling circuit according to one embodiment of this invention.

It needs to be supplemented that the implementation of the feedback controlling circuit 945 can be the feedback controlling circuit 402 in FIG. 4 which further includes the maximum selection circuit 901, as shown in FIG. 10. FIG. 10 depicts a schematic diagram of a feedback controlling circuit according to one embodiment of this invention. According to FIG. 10, comparing to the feedback controlling circuit 402, the feedback controlling circuit 945 is further includes the maximum selection circuit 901 for receiving the comparing signal Vc0, Vc0'. Similarly, the comparing signal Vc0 outputted from the comparing circuit 144 will be compared to the sawtooth wave generated by the sawtooth generator 421, so as to generate the control signal Vc1.

Figure 11:
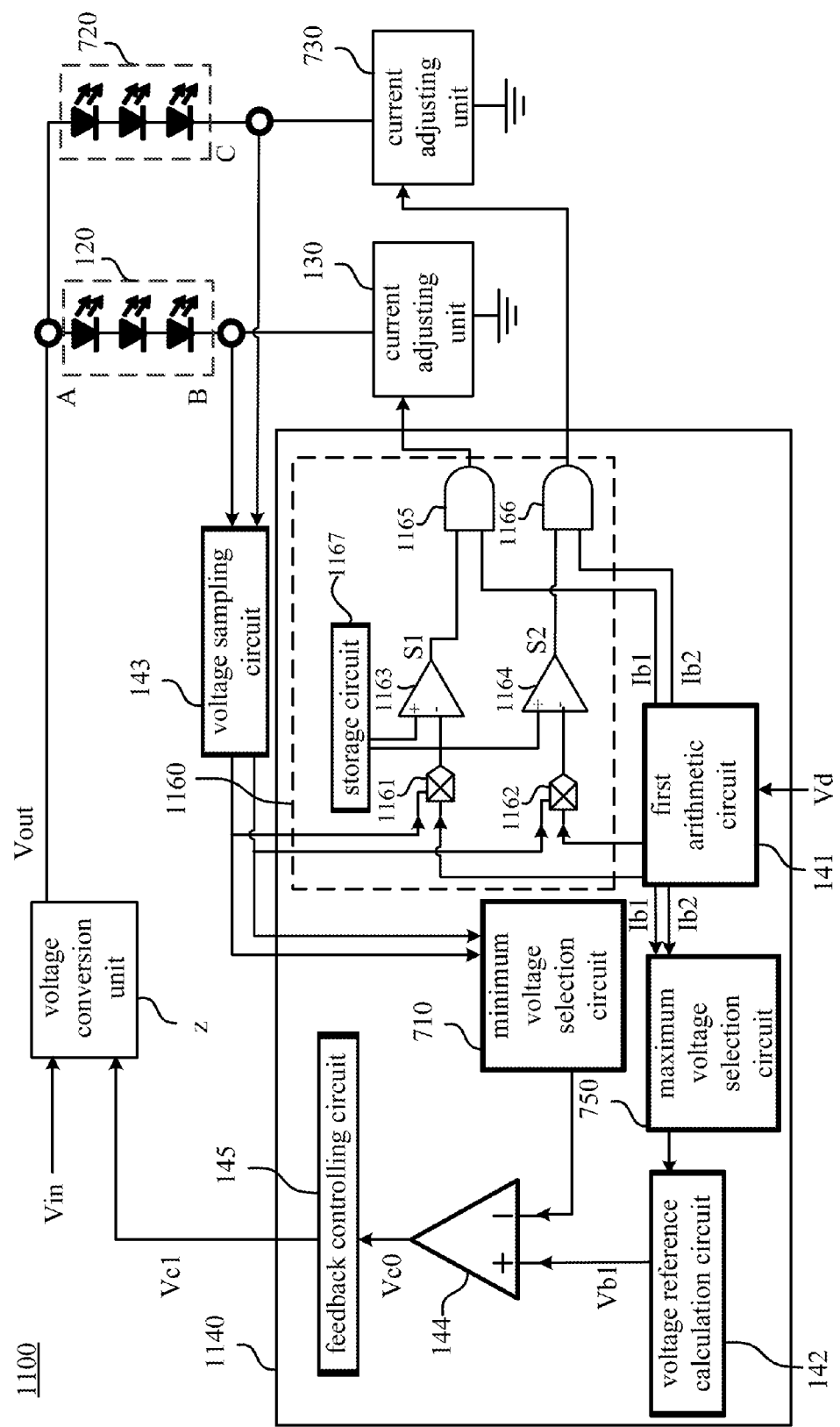
FIG. 11 depicts a schematic diagram of an electronic device according to one embodiment of this invention.

In some embodiments, the control unit can further include the constant power protection circuit under the short-circuited condition. Please refer to FIG. 11, FIG. 11 depicts a schematic diagram of an electronic device 1100 according to one embodiment of this invention. As shown in FIG. 11, comparing to the control unit 740 of the electronic device 700, the control unit 1140 further includes a constant power protection circuit 1160, which is coupled with the current adjusting units 130 and 730 for disabling the current adjusting units 130, 730 according to the power reference signal Ib1, Ib2.

Further, the constant power protection circuit 1160 includes multiplying circuits 1161 and 1162, comparators 1163 and 1164 and gates 1165 and 1166. The multiplying circuits 1161 and 1162 are used for generating the corresponding power signals P1, P2 according to the voltage of the second terminals B, C of the load unit 120 and 720 and the current reference signals Ib1 and Ib2. The comparators 1163, 1164 are electrically coupled with multiplying circuits 1161 and 1162 for generating the protection signals S1 and S2 according to the power signals P1 and P2 and the power reference signals Pb1 and Pb2. Wherein when the voltages of the power signals P1 and P2 are bigger than the voltages of the power reference signals Pb1 and Pb2, the voltages of the protection signals S1 and S2 are in a logic low level. Each gate 1165 and 1166 includes a first input terminal for receiving the protection signals S1 and S2, a second input terminal for receiving the current reference signals Ib1 and Ib2, and an output terminal electrically coupled with the current adjusting units 130 and 730.

To avoid that the transistors M1 and Mt of the current adjusting units 130 and 730 and the resistances R1 and R1' are damaged by overheating under the short-circuited condition. The power signals P1 and P2 generated by the multiplying circuits 1161 and 1162 represent the real power consumption of the current adjusting units 130 and 730. On the other hand, in this embodiment, the constant power protection circuit 1160 can include a storage circuit 1167. The storage circuit 1167 can be volatile memory, non-volatile memory, or any other memory having the storage function, not limited to herein. The transistor and the resistance may have different maximum load power values due to the different process parameters, packaging structures, and heat loss conditions. Therefore, the storage circuit 1167 is used for storing the maximum load power values of the transistors M1 and M1' in the current adjusting units 130 and 730 and the resistances R1 and R1'. The storage circuit 1167 provides the power reference signals Pb1 and Pb2 to the comparators 1163 and 1164 according to the maximum load power values above mentioned. Therefore, the comparators 1163 and 1164 can compare the real power consumption (power signals P1, P2) of the current adjusting units 130 and 730 and its maximum load power values (power reference signals Pb1 and Pb2) to generate the protection signals S1 and S2. For instance, when the voltage of the power signals P1 and P2 are bigger than the voltage of the power reference signals Pb1 and Pb2, the voltages of the protection signals S1 and S2 are in a logic low level.

Figure 12:
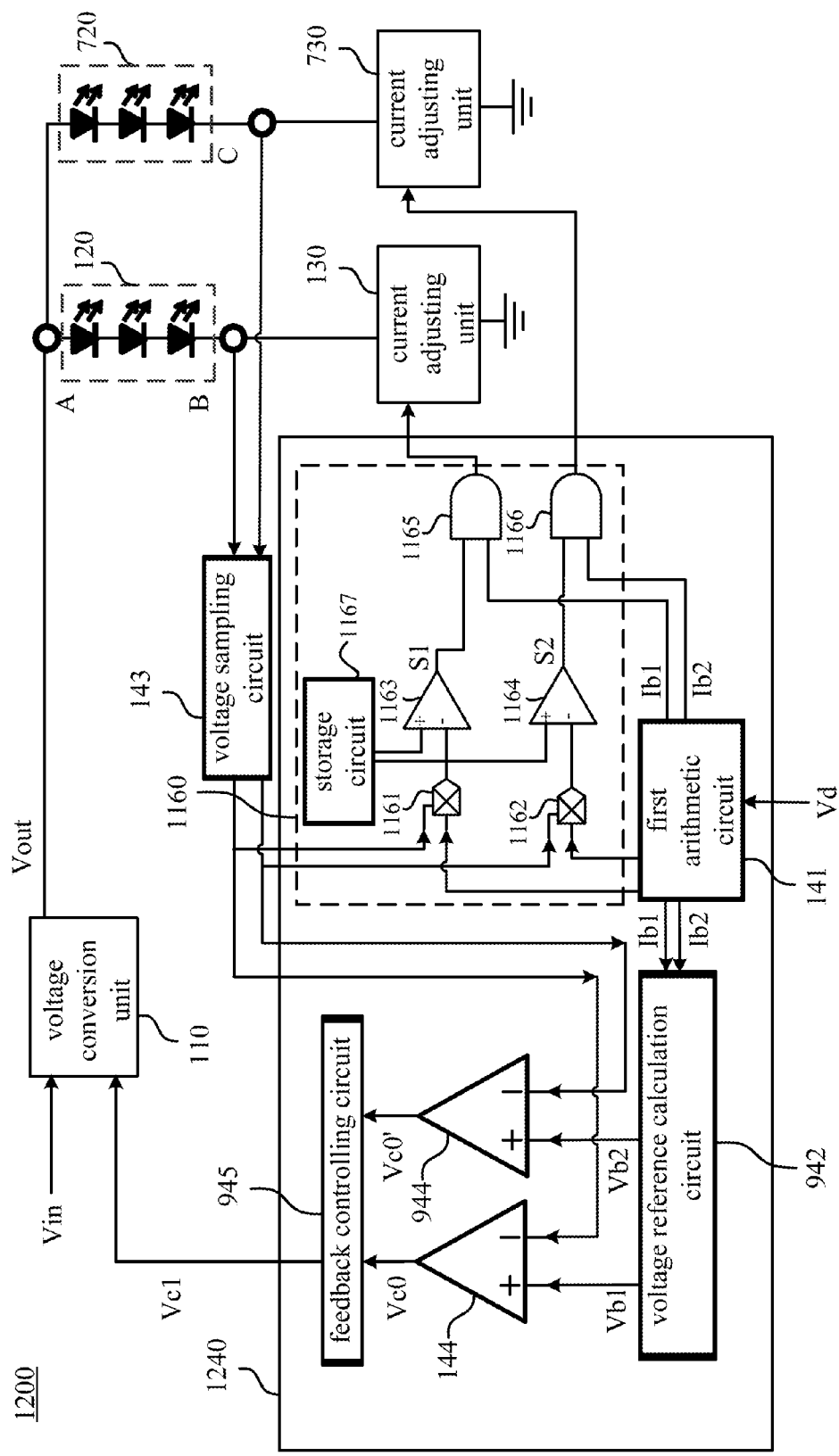
FIG. 12 depicts a schematic diagram of an electronic device according to one embodiment of this invention.

Therefore, it can be seen that by the configuration of the gates 1165 and 1166 and while the electronic device 1100 operates normally, the current adjusting units 130 and 730 still can keep normally receiving the current reference signals Ib1 and Ib2. However, in the condition that if any load unit of electronic device 1100 is short-circuited, such as, the output of the load unit 120 is short-circuited, the voltage of the power signal P1 will be bigger than the voltage of the power reference signal Pb1. The voltage of the protection signal S1 is in logic low level, so as to disable the current adjusting unit 130. The current adjusting unit 730 still keeps normally receiving the current reference signal Ib2, so as to make the 720 still keeps normally receiving the driving current Id2. In contrast, if the output of the current adjusting unit 730 is short-circuited the voltage of the power signal P2 will be bigger than the voltage of the power reference signal Pb2. The voltage of the protection signal S2 is in logic low level, so as to disable the current adjusting unit 730. The current adjusting unit 130 still keeps normally receiving the current reference signal Ib1, so as to make the load unit 120 still keep normally receiving the driving current Id1. Similarly, the constant power protection circuit 1160 also can be used in the electronic device 900 in FIG. 9. Please refer to FIG. 12, FIG. 12 depicts a schematic diagram of an electronic device 1200 according to one embodiment of this invention. The detailed operation related to the constant power protection circuit 1160 in electronic device 1200 is the same as above description in practice. Thus, the detailed operation related to the constant power protection circuit 1160 is not further described herein.

Based on the above, the present invention relates to an electronic device. More particularly, the present invention relates to an electronic device for saving power consumption. The present invention saves power consumption by adjusting the current reference signal received by the linear constant current circuit and controlling the voltage conversion unit according to the control signal generated by the voltage reference signal. In some embodiments, the electronic device can be used to individually protect each path load of the multi-path load in parallel by the constant power protection circuit. In addition, in some embodiments, the electronic device expands the dimming range in dimming application by configuring the supplementary current control unit.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device comprising:
a voltage conversion unit configured to transfer an input voltage to an output voltage;
a first load unit comprising a first terminal and a second terminal, and the first terminal configured to receiving the output voltage;
a current adjusting unit electrically coupled with the second terminal of the first load unit, configured to control a first driving current flowing through the first load unit according to a first current reference signal; and
a control unit electrically coupled with the first load unit and the voltage conversion unit, configured to generate a first voltage reference signal according to the first current reference signal and generate a first control signal to the voltage conversion unit according to a voltage of the second terminal of the first load unit and the first voltage reference signal.

2. The electronic device of claim 1, wherein the current adjusting unit further comprising:
a first transistor comprising a first terminal, a second terminal, and a control terminal, and the first terminal of the first transistor electrically coupled with the first load unit; and
a first resistance electrically coupled with the second terminal of the first transistor; wherein the first transistor operates at a linear interval.

3. The electronic device of claim 2, wherein the current adjusting unit further comprising:
a first operational amplifier comprising a first terminal configured to receive the first current reference signal, a second terminal electrically coupled with the second terminal of the first transistor, and an output terminal electrically coupled with the control terminal of the first transistor and configured to output a second control signal to the control terminal of the first transistor.

4. The electronic device of claim 2, wherein the control unit further comprising:
a voltage reference calculation circuit configured to calculate a first voltage difference across the first resistance according to the first current reference signal, calculate a impedance of the first transistor according to the first current reference signal, and calculate a second voltage difference across the first resistance according to the first current reference signal and the impedance of the first transistor; wherein the first voltage reference signal is positively associated with the sum of the first voltage difference and the second voltage difference.

5. The electronic device of claim 1, wherein the control unit further comprising:
a voltage sampling circuit configured to sample the voltage of the second terminal of the first load unit;
a comparator electrically coupled with the voltage sampling circuit, configured to generate a comparing signal according to the voltage of the second terminal of the first load unit and the first voltage reference signal; and
a feedback controlling circuit electrically coupled with the comparator, configured to generate the first control signal according to the comparing signal.

6. The electronic device of claim 1, further comprising:
a supplementary current control unit coupled with the current adjusting unit in parallel; wherein the current adjusting unit controls a first potion of the first driving current according to the first current reference signal, and the supplementary current control unit controls a second potion of the first driving current according to a supplementary current reference signal.

7. The electronic device of claim 6, wherein the current adjusting unit further comprising:
a first transistor comprising a first terminal, a second terminal, and a control terminal, and the first terminal of the first transistor electrically coupled with the first load unit; and
a first resistance electrically coupled with the second terminal of the first transistor; wherein the first transistor operates at a linear interval;
the supplementary current control unit comprising:
a second transistor comprising a first terminal, a second terminal, and a control terminal, and the first terminal of the second transistor electronically coupled with the first load unit; and
a second resistance electrically coupled with the second terminal of the second transistor; wherein the second transistor operates at the linear interval, and a proportion between an impedance of the second resistance and an impedance of the first resistance is N, and N is a value bigger than 10, the first potion of the first driving current is larger than the second potion of the first driving current.

8. An electronic device comprising:
a voltage conversion unit configured to transfer an input voltage to an output voltage;
a plurality of load units, each one of the load units comprising a first terminal and a second terminal, and the first terminal in each one of the load units configured to receive the output voltage;
a plurality of current adjusting units, each one of the current adjusting units respectively and electronically coupled with the second terminal of the load units, the current adjusting units configured to control a driving current flowing through each one of the load units according to a plurality of current reference signals; and
a control unit electrically coupled with the load units and the voltage conversion unit, configured to generate at least one voltage reference signal according to the current reference signals and generate a first control signal to the voltage conversion unit according to a voltage of the second terminal of the load units and the at least one voltage reference signal.

9. The electronic device of claim 8, wherein the control unit generates the first control signal to the voltage conversion unit according to a minimum value of the voltages of the second terminals of the load units and a maximum value of the current reference signals.

10. The electronic device of claim 8, wherein each one of the current adjusting units comprising:
a first transistor comprising a first terminal, a second terminal, and a control terminal, and the first terminal of the first transistor electrically coupled with the load units; and
a first resistance electrically coupled with the second terminal of the first transistor; wherein the first transistor operates at a linear interval.

11. The electronic device of claim 10, wherein each one of the current adjusting units comprising:
a first operational amplifier comprising a first terminal configured to receive the current reference signals, a second terminal electrically coupled with the second terminal of the first transistor of each one of the current adjusting units, and an output terminal electrically coupled with the control terminal of the first transistor of each one of the current adjusting units and configured to output a second control signal to the control terminal of the first transistor.

12. The electronic device of claim 10, wherein the control unit comprising:
a voltage reference calculation circuit configured to calculate the at least one voltage reference signal according to a maximum current signal.

13. The electronic device of claim 12, wherein the control unit further comprising:
a voltage sampling circuit configured to sample the voltage of the second terminal of the load units;
a minimum voltage selection circuit configured to generate a minimum voltage signal according to the minimum value of the voltages of the second terminals of the load units;
a maximum current selection circuit electrically coupled with the voltage reference calculation circuit, configured to generate the maximum current signal according to the maximum value of the current reference signals;
a comparator electrically coupled with the voltage sampling circuit, configured to generate a comparing signal according to the minimum voltage signal and the at least one voltage reference signal; and
a feedback controlling circuit electrically coupled with the comparator, configured to generate the first control signal according to the comparing signal.

14. The electronic device of claim 13, wherein the voltage reference calculation circuit configured to calculate a first voltage difference across the first resistance of the current adjusting unit having the maximum value of the current reference signals according to the maximum current signal, and the voltage reference calculation circuit configured to calculate a impedance of the first transistor of the current adjusting unit having the maximum value of the current reference signals according to the maximum current signal and calculate a second voltage difference across the first resistance according to the impedance of the first transistor; wherein the at least one voltage reference signal is positively associated with the sum of the first voltage difference and the second voltage difference.

15. The electronic device of claim 11, wherein the control unit further comprising:
a voltage reference calculation circuit configured to calculate a first voltage difference across the first resistance corresponding to each one of the current adjusting units according to each one of the current reference signals, and the voltage reference calculation circuit configured to calculate a impedance of the first transistor of each one of the current adjusting units and calculate a second voltage difference across the first resistance according to the impedance of the first transistor and each one of the current reference signals; wherein each one of the at least one voltage reference signals is positively associated with the sum of the first voltage difference and the second voltage difference of each one of the current adjusting units.

16. The electronic device of claim 15, wherein the control unit comprising:
a voltage sampling circuit configured to sample the voltage of the second terminal of the load units;
a plurality of comparators electrically coupled with the voltage sampling circuit, configured to generate a plurality of comparing signals according to the voltage of the second terminal of the load units and the at least one voltage reference signal; and
a feedback controlling circuit electrically coupled with the comparators, configured to generate the first control signal according to a maximum value of the comparing signals.

17. The electronic device of claim 8, wherein the control unit comprising:
a constant power protection circuit electrically coupled with the current adjusting units, configured to disable the current adjusting units according to a plurality of power reference signals.

18. The electronic device of claim 17, wherein the constant power protection circuit comprising:
a plurality of multiplying circuits configured to generate the corresponding power signals according to the voltage of the second terminals of the load units and the current reference signals;
a plurality of comparators electrically coupled with the multiplying circuits, configured to generate a plurality of protection signals according to the power signals and the power reference signals; wherein when the voltages of the power signals are bigger than the voltages of the power reference signals, the voltages of the protection signals are in a logic low level; and
a plurality of gates, each one of the gates comprises a first input terminal configured to receive the protection signals, a second input terminal configured to receive the current reference signals, and an output terminal electrically coupled with the current adjusting units.

19. The electronic device of claim 8, further comprising:
a plurality of supplementary current control units coupled with the current adjusting units in parallel; wherein the current adjusting units control a first potion of the driving current of each one of the load units according to the current reference signals, and the supplementary current control units control a second potion of the driving current of each one of the load units according to a supplementary current reference signal.

20. The electronic device of claim 19, wherein each one of the control units further comprising:
 a first transistor comprising a first terminal, a second terminal, and a control terminal, and the first terminal of the first transistor electrically coupled with the load units; and
a first resistance electrically coupled with the second terminal of the first transistor; wherein the first transistor operates in a linear interval;
each one of the supplementary current control units comprising:
a second transistor comprising a first terminal, a second terminal, and a control terminal, and the first terminal of the second transistor electronically coupled with the load units; and
a second resistance electrically coupled with the second terminal of the second transistor; wherein the second transistor operates at the linear interval, and a proportion between an impedance of the second resistance and an impedance of the first resistance is N, and N is a value bigger than 10, the first potion of the driving current of each one of the load units is larger than the second potion of the driving current of each one of the load units.

* * * * *